(12) United States Patent
Bush et al.

(10) Patent No.: US 9,097,538 B1
(45) Date of Patent: Aug. 4, 2015

(54) ROVER

(76) Inventors: Steve Bush, Milan, IL (US); Kevin Vandevoorde, Milan, IL (US)

( * ) Notice: Subject to any disclaimer, the term of this patent is extended or adjusted under 35 U.S.C. 154(b) by 572 days.

(21) Appl. No.: 13/349,528

(22) Filed: Jan. 12, 2012

Related U.S. Application Data

(60) Provisional application No. 61/432,113, filed on Jan. 12, 2011.

(51) Int. Cl.
*G01C 21/26* (2006.01)
*G01S 19/35* (2010.01)

(52) U.S. Cl.
CPC ............... *G01C 21/26* (2013.01); *G01S 19/35* (2013.01)

(58) Field of Classification Search
USPC .............. 701/41, 44, 412, 468, 470, 519; 342/350, 352, 357.64, 357.75, 357.31, 342/357.52, 357.22, 357.36; 455/12.1, 455/13.1; 343/703; 901/1; 700/245; 172/1
See application file for complete search history.

(56) References Cited

U.S. PATENT DOCUMENTS

| | | | | |
|---|---|---|---|---|
| 5,897,156 | A * | 4/1999 | Hayard et al. ............ 296/136.13 |
| 6,066,026 | A * | 5/2000 | Bart et al. ..................... 446/460 |
| 6,502,657 | B2 * | 1/2003 | Kerrebrock et al. .......... 180/218 |
| 6,668,950 | B2 * | 12/2003 | Park .............................. 180/7.1 |
| 6,860,346 | B2 * | 3/2005 | Burt et al. ...................... 180/8.2 |
| 7,056,185 | B1 * | 6/2006 | Anagnostou .................. 446/456 |
| 8,018,376 | B2 * | 9/2011 | McClure et al. ............. 342/350 |
| 8,140,223 | B2 * | 3/2012 | Whitehead et al. ............. 701/41 |
| 8,430,192 | B2 * | 4/2013 | Gillett ........................ 180/65.51 |
| 8,639,181 | B2 * | 1/2014 | Caplin et al. ................. 455/12.1 |
| 2002/0011368 | A1 * | 1/2002 | Berg ............................. 180/218 |
| 2005/0072616 | A1 * | 4/2005 | Pal ................................ 180/218 |
| 2009/0164067 | A1 * | 6/2009 | Whitehead et al. ............. 701/41 |
| 2009/0251366 | A1 * | 10/2009 | McClure et al. ......... 342/357.09 |
| 2009/0284425 | A1 * | 11/2009 | Snow et al. .................... 343/703 |
| 2011/0097995 | A1 * | 4/2011 | Caplin et al. ................. 455/12.1 |
| 2012/0050104 | A1 * | 3/2012 | Jakab et al. .............. 342/357.75 |

FOREIGN PATENT DOCUMENTS

BR 200902844 A2 * 5/2010
EP 2156724 A2 * 2/2010

OTHER PUBLICATIONS

Hyperion project follows sun; Schreiner, K. ; Intelligent Systems, IEEE; vol. 16 , Issue: 5; Digital Object Identifier: 10.1109/5254. 956075; Publication Year: 2001 , pp. 4-8.*

(Continued)

*Primary Examiner* — Cuong H Nguyen
(74) *Attorney, Agent, or Firm* — Hamilton IP Law, PC; Jay R. Hamilton; Charles A. Damschen

(57) ABSTRACT

A rover for precisely determining the topography of a given parcel by contacting the surface of the parcel includes a GPS module and at least one sensor wheel. The GPS module may be mounted adjacent to and work in concert with the sensor wheel. The attitude and heading of the sensor wheel may be measured with another sensor, such as an AHRS, and the angle of the sensor wheel may be measured with a rotation position sensor. The various data points may be distilled to accurately measure the topography of a given parcel when the relative positions of the GPS module and the center of the sensor wheel are constant.

13 Claims, 12 Drawing Sheets

(56) References Cited

OTHER PUBLICATIONS

Rover odometry aided by a star tracker; Gammell, J.D. ; Chi Hay Tong ; Berczi, P. ; Anderson, S. ; Barfoot, T.D. ; Enright, J. Aerospace Conference, 2013 IEEE; Digital Object Identifier: 10.1109/AERO. 2013.6496953 Publication Year: 2013 , pp. 1-10.*

Design and implementation of a rover-back CANSAT; Aydemir, M.E. ; Vivas, E.V. ; Celebi, M. ; Bustinza, F.C. ; Ay, S. ; Phan, D. Recent Advances in Space Technologies (RAST), 2011 5th International Conference on; Digital Object Identifier: 10.1109/RAST.2011. 5966952; Publication Year: 2011 , pp. 800-803.*

Identification of terrain mechanical parameters for a six-wheeled lunar rover; Yuan Laohu ; Liu Tun ; Zhao ZhiPing ; Ge WeiPing Systems and Control in Aerospace and Astronautics, 2008. ISSCAA 2008. 2nd International Symposium on; DOI: 10.1109/ISSCAA. 2008.4776265; Publication Year: 2008 , pp. 1-6.*

Experience with rover navigation for lunar-like terrains; Simmons, R.; Krotkov, E.; Chrisman, L.; Cozman, F.; Goodwin, R.; Hebert, M.; Katragadda, L.; Koenig, S.; Krishnaswamy, G.; Shinoda, Y.; Whittaker, W.L.; Klarer, P. Intelligent Robots and Systems 95. 'Human Robot Interaction and Cooperative Robots', Proceedings. 1995 IEEE/RSJ Int.*

Command data compensation for real-time tele-driving system on lunar rover: Micro-5; Kunii, Y. ; Kuroda, Y. ; Suhara, M. ; Kubota, T.; Robotics and Automation, 2001. Proceedings 2001 ICRA. IEEE International Conference on; vol. 2 DOI: 10.1109/ROBOT.2001. 932805; Publication Year: 2001 , pp. 1394-1399 vol. 2.*

Fault analysis on driving motors of lunar rover wheels; Li Wang ; Jinglin Liu ; Xigiao Wu; Electrical Machines and Systems (ICEMS), 2011 International Conference on; DOI: 10.1109/ICEMS.2011. 6073467; Publication Year: 2011 , pp. 1-3.*

\* cited by examiner

Surface variations at .125"

Surface variations at 1.25"

ROVER

CROSS REFERENCE TO RELATED APPLICATIONS

Applicant claims the filing benefit under 35 U.S.C. §119(e) of provisional U.S. Patent Application No. 61/432,113 filed Jan. 12, 2011, which is incorporated by reference herein in its entirety.

FIELD OF INVENTION

The present invention relates to a device and method for gathering information, and more particularly for gathering topical, geographical, terrain, and/or environmental information about a specific parcel of real property.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

It is often desirable to generate a terrain map for a particular geographic area. One such situation is a golf course, for which a terrain map is useful for golfers playing on the course. It is often the case that a golf course will provide a basic, two-dimensional terrain map to golfers. For example, it is customary for such a two-dimensional terrain map to be included on a back portion of a course scorecard.

Another situation, and one which requires even more precision than a golf course, is a baseball or football field. With athletes performing at full speed, even minor imperfections in the sporting surface may greatly increase the likelihood of injury, or the likelihood that a sporting surface imperfection will adversely affect the game (e.g., an untrue bounce from a ball). Imperfections as small at one millimeter may have unfortunate consequences.

Accordingly, a precise three-dimensional map is useful in many situations. However, traditionally the generation of a three dimensional terrain map is a more complex and expensive undertaking, and as such, they are rarely created with the proper precision.

One example of a three-dimensional terrain mapping apparatus and method is disclosed in US Pat. App. Pub. No. 2010/0245169. However, this apparatus/method does not provide the user with the required precision.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 1:
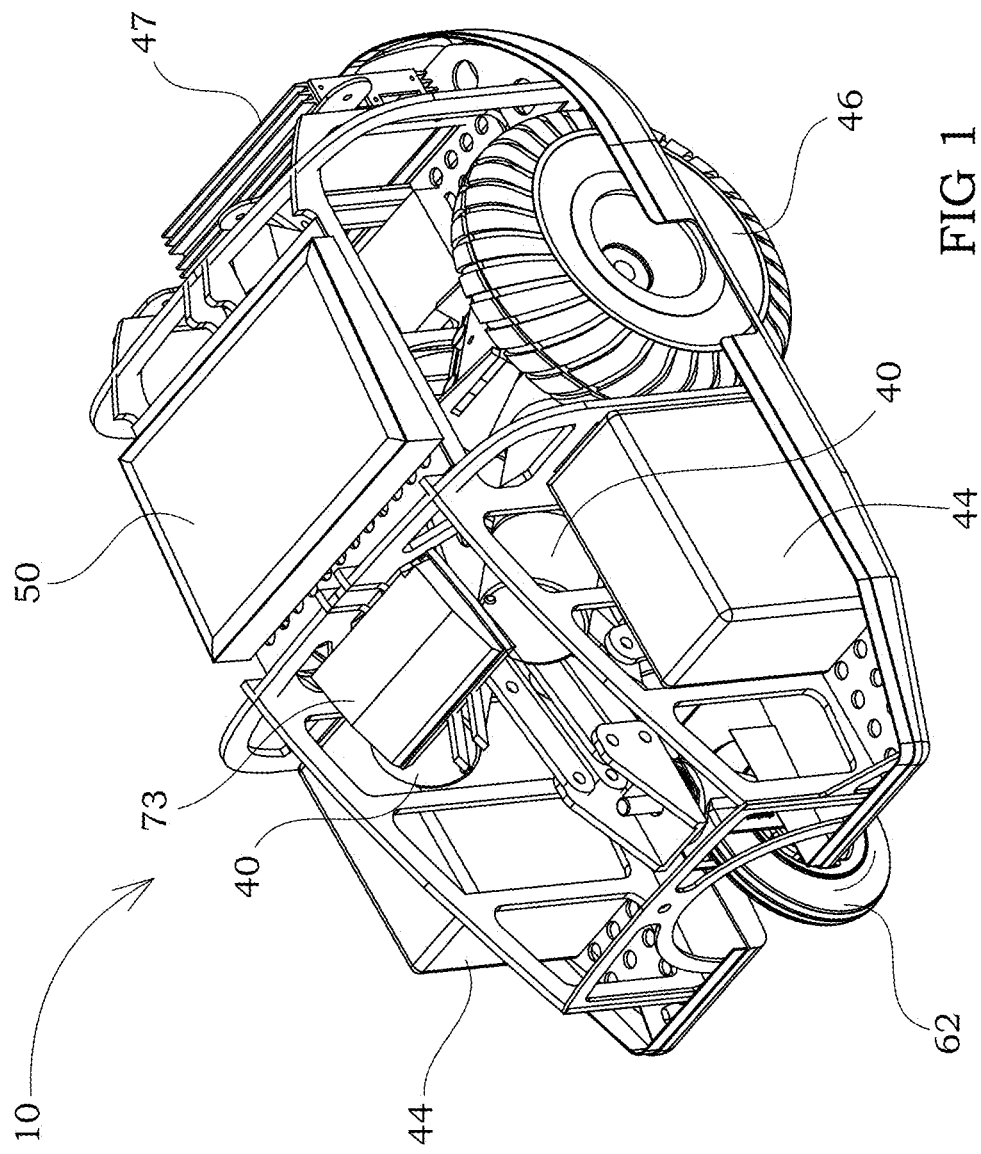
FIG. 1 provides a perspective view of one embodiment of a rover with the cover removed for clarity.

| DETAILED DESCRIPTION - ELEMENT LISTING | |
|---|---|
| ELEMENT | ELEMENT # |
| Rover | 10 |
| Cover | 12 |
| Access door | 12a |
| Actuator | 14 |
| Frame | 20 |
| Frame base | 21 |
| Driven wheel support tab | 21a |
| Driven wheel support pivot | 21b |
| First driven wheel receiver | 22 |
| First slot | 22a |
| Lateral brace | 23a |
| Vertical brace | 23b |
| Second driven wheel receiver | 24 |
| Second slot | 24a |
| Extension arm tab | 24b |
| Extension pivot | 24c |
| Floor plate | 25 |
| First arch | 26a |
| Second arch | 26b |
| Third arch | 26c |
| Actuator support member | 27 |
| Component support | 28 |
| Translator tab | 29 |
| Driven wheel support frame | 30 |
| Frame pivot tab | 30a |
| Actuator pivot tab | 30b |
| Translator connector | 32 |
| Translator pivot | 32a |
| First bar | 34 |
| Second bar | 36 |
| Motor | 40 |
| Gearbox | 42 |

DETAILED DESCRIPTION - ELEMENT LISTING

| ELEMENT | ELEMENT # |
|---|---|
| Battery | 44 |
| Hub | 45 |
| Driven wheel | 46 |
| Motor controller | 47 |
| Wheel angle encoder | 48 |
| CPU | 50 |
| Caster assembly | 60 |
| Caster yoke receiver | 61 |
| GPS mount | 61a |
| Caster plate | 61b |
| Sensor wheel | 62 |
| Yoke | 63 |
| Rotation position sensor | 64 |
| Extension arm | 65 |
| Translator | 66 |
| Connector | 67 |
| Sensor | 70 |
| Camera | 71 |
| GPS module | 72 |
| Transponder | 73 |
| Proximity sensor | 74 |
| Attitude and reference heading system (AHRS) | 76 |
| Control port | 77 |
| Micro-controller | 78 |
| Roughness module | 80 |
| Roughness sensor | 82 |
| Encoder | 84 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

1. Description of Illustrative Embodiments

Referring now to the drawings, wherein like reference numerals designate identical or corresponding parts throughout the several views, FIG. 1 provides a perspective view of a first embodiment of a rover 10. The view in FIG. 1 shows the rover 10 with the cover 12 removed for purposes of clarity.

Generally, the rover 10 includes a frame 20 to which various elements of the rover 10 are mounted and/or secured. One embodiment of a frame 20 is shown in perspective in FIGS. 2A & 2B. That embodiment of the frame 20 includes a frame base 21 with a plurality of other elements attached thereto. An infinite number of configurations for a frame 20 that may be used with the rover 10 exist. Accordingly, the specific embodiments of a frame disclosed and claimed herein in no way limit the scope of the rover 10 as claimed herein. Generally, it is contemplated that the frame 20 will be optimized for strength, size, and capacity for carrying various components of the rover 10.

Figure 2A:
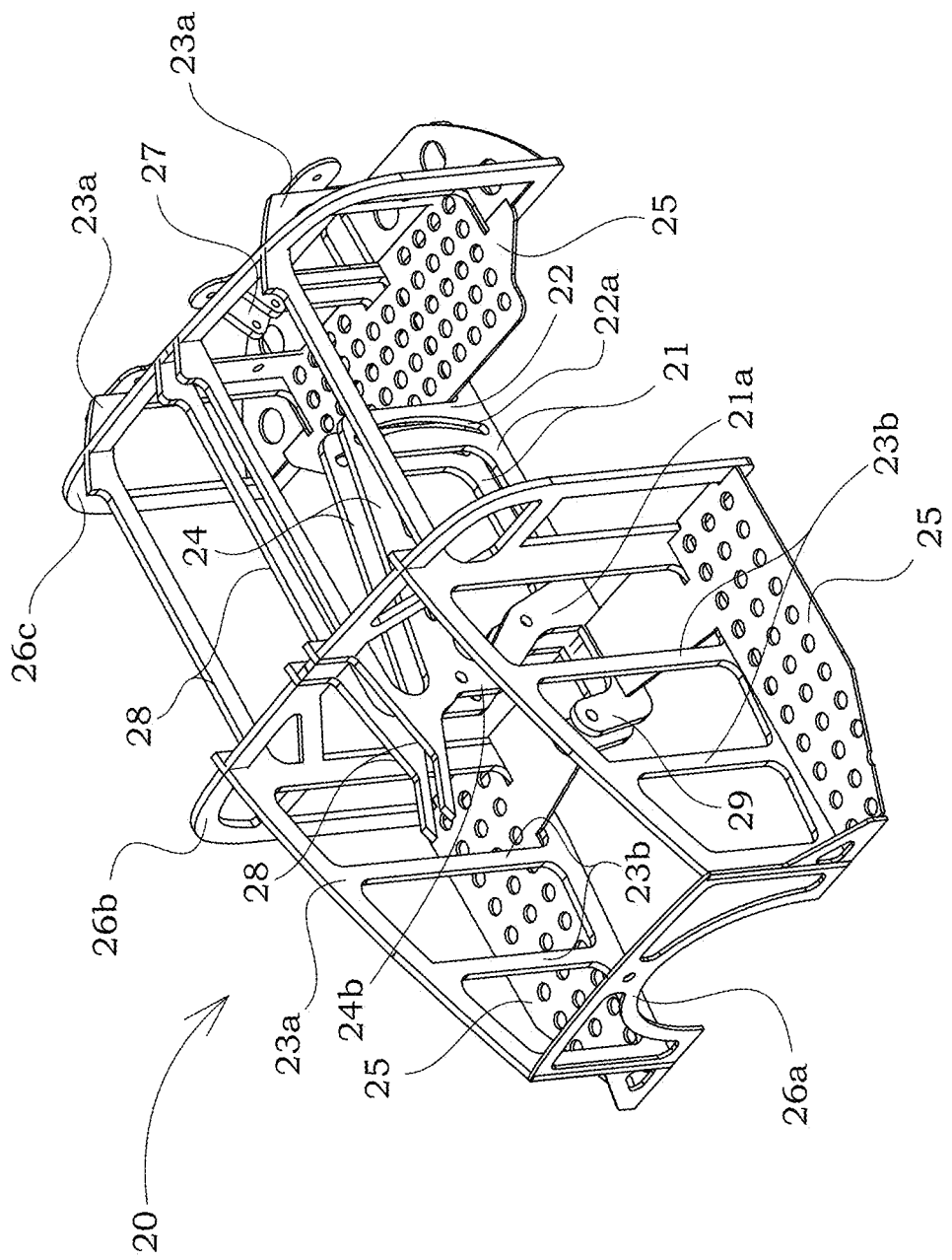
FIG. 2A provides a top perspective view of one embodiment of a frame that may be used with certain embodiments of the rover.
Figure 2B:
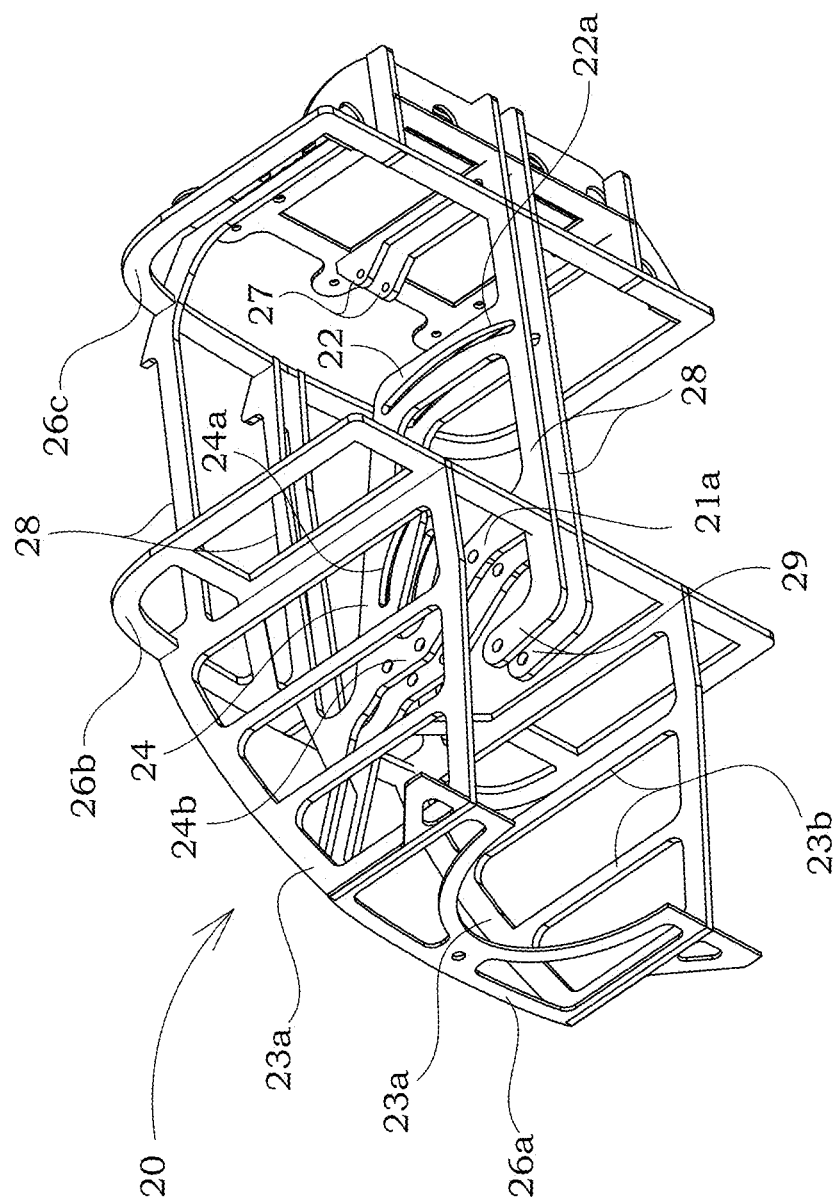
FIG. 2B provides a bottom perspective view of one embodiment of a frame that may be used with certain embodiments of the rover.
Figure 2C:
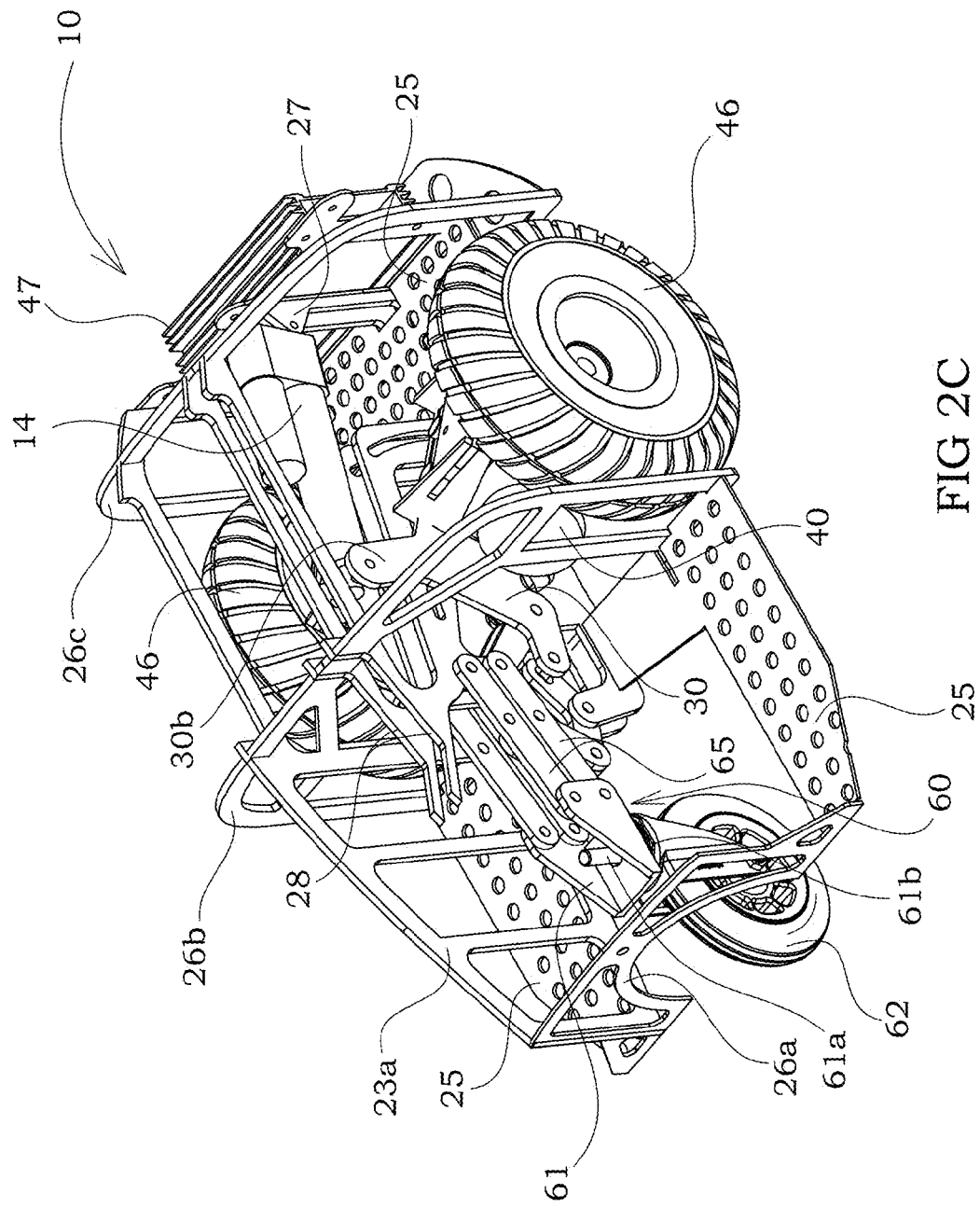
FIG. 2C provides a top perspective view of one embodiment of a frame, driven wheel support frame, and caster assembly that may be used with certain embodiments of the rover.

Referring generally to FIGS. 2A-2B, the frame base 21 may include an integrally formed driven wheel support tab 21a, first driven wheel receiver 22 and second drive wheel receiver 24. The first driven wheel receiver may be formed with a first slot 22a therein and the second driven wheel receiver 24 may be formed with a second slot 24a therein. An extension arm tab 24b may be formed adjacent the driven wheel support tab 21a and the second driven wheel receiver 24. A plurality of vertical braces 23b may be secured to the frame base 21, and a plurality of lateral braces 23a may extend between vertical braces 23b. First, second, and third arches 26a, 26b, 26c may be affixed to the frame base 21 to which various other elements of the frame 20 may be affixed. An actuator support member 27 may be fashioned to extend generally upward from the frame base 21. Additionally, a translator tab 29 may be configured to extend upward from the frame base 21. Component supports 28 may be affixed to various elements of the frame 20 to provide structural support to the frame 20 and secure positions on which to place various other elements of the rover 10 described below. Finally, floor plates 25 may be affixed to other structural elements of the frame 20 to protect internal elements of the rover 10 and/or provide additional structural rigidity/robustness to the frame 20 (best shown in FIGS. 2A, 2C and 7A. The various elements of the frame 20 may be integrally formed with one another or be separately formed and later attached.

In the illustrative embodiment of a frame 20 pictured herein, various portions of the frame 20 are formed in pairs (e.g., certain portions of the frame base 21, driven wheel support tab 21a, first and second driven wheel receiver 22, 24, etc.). The individual members of each pair may be separated by a predetermined distance along the width of the rover 10, but may be mechanically engaged with one another via structural elements of the frame 20. For example, portions of the frame base 21 may be affixed to both individual members of the driven wheel support tab 21a. For purposes of clarity, these elements will be referred to in the singular throughout without limitation. However, other embodiments of the frame 20 exist in which these elements need not be paired.

Referring now generally to FIGS. 2C-4, a driven wheel support frame 30 may be pivotally mounted to the frame 20 via a driven wheel support pivot 21b and the first and second slots 22a, 24a. The driven wheel support frame 30 may be fashioned with a frame pivot tab 30a and an actuator pivot tab 30b. A translator connector 32 may be positioned adjacent the frame pivot tab 30a. As was explained above for the frame 20, in the illustrative embodiment of the driven wheel support frame 30, various elements thereof are formed in pairs (e.g., frame pivot tab 30a, actuator pivot tab 30b, etc.). The individual members of each pair may be separated by a predetermined distance along the width of the rover 10, but may be mechanically engaged with one another via other structural elements, such as first and second bars 34, 36 as shown for the illustrative embodiment pictured herein. The various elements of the driven wheel support frame 30 may be integrally formed with one another or be separately formed and later attached.

It is contemplated that the frame 20 and driven wheel support frame 30 may be constructed of aluminum or other metals that have the required strength to weight ratio for the specific application of the rover 10. More specifically, it is contemplated that the illustrative embodiments of the frame 20 and driven wheel support frame 30 shown herein will be comprised of $\frac{1}{8}^{th}$ inch aluminum. However, other materials may be used without limitation, including but not limited to natural fibers, synthetic materials, metal alloys, and/or combinations thereof.

The illustrative embodiment of the rover 10 as pictured herein includes two driven wheels 46 on either side of the rover 10, which driven wheels are in mechanical communication with at least one motor 40. A hub 45 of each driven wheel 46 may be engaged with the driven wheel support frame 30 such that each driven wheel 46 is rotatable with respect to the driven wheel support frame 30. In the illustrative embodiment, one motor 40 is associated with each driven wheel 46, and the motors 40 are electrically powered. However, in other embodiments of the rover 10 the driven wheels 46 may be powered differently without the use of onboard motors 40, and motors 40 other than those that are electrically powered may be used without limitation. Additionally, each motor 40 may require a gearbox (not shown) to translate the rotational mechanical energy from the motor 40 to the driven wheel 46. The motors 40 may be controlled by a motor controller 47, as shown in FIGS. 7A & 7B. The motor controller 47 may be in communication with a wheel angle encoder 48 (shown schematically in FIG. 6) adjacent each driven wheel 46, which provides the motor controller 47 and/or CPU 50 data about the position of the rotational position of the respective driven wheel 46.

As best shown in FIGS. 2C-4, a plurality of extension arms 65 may be pivotally engaged with the frame 20 adjacent the extension arm tab 24b. Each extension arm 65 may be configured to pivot with respect to the frame 20 about an individual extension pivot 24c. A caster assembly 60 may be pivotally engaged with the extension arms 65 at the end of the extension arms 65 opposite the extension pivots 24c. A sensor wheel 62 may be cooperatively engaged with the caster assembly 60. A yoke 63 may be pivotally engaged with a caster yoke receiver 61 such that the yoke 63 may rotate with respect to the caster yoke receiver 61 (and consequently with respect to the frame 20) about a generally vertical axis. The sensor wheel 62 may be rotatably mounted to the yoke 63 such that the sensor wheel 62 is free to rotate with respect to the yoke 63 about a generally horizontal axis. This design allows the sensor wheel 62 to maintain accurate contact with the surface on which the rover 10 rests during use (which is described in further detail below).

The illustrative embodiment is configured so that the sensor wheel 62 will generally trail the driven wheels 46 during use. The driven wheels 46 may be configured to pilot the rover 10 about a predetermined path by varying the rotational speed of one driven wheel 46 with respect to the other (also referred to as "tank steering" or "skid steering"). Other embodiments of the rover 10 may be controlled and/or piloted differently without limitation.

Still referring to FIGS. 2C-4, a translator 66 may be pivotally engaged with the frame 20 adjacent the translator tab 29. In the illustrative embodiment, the translator 66 is engaged with the frame 20 generally near the center of the translator 66. One end of the translator 66 may be pivotally engaged with the driven wheel support frame 30 about a translator pivot 32a formed in the translator connector 32 and the opposite end of the translator may be pivotally engaged with at least one connector 67. The connector 67, in turn, may be pivotally engaged with at least one extension arm 65.

Figure 3A:
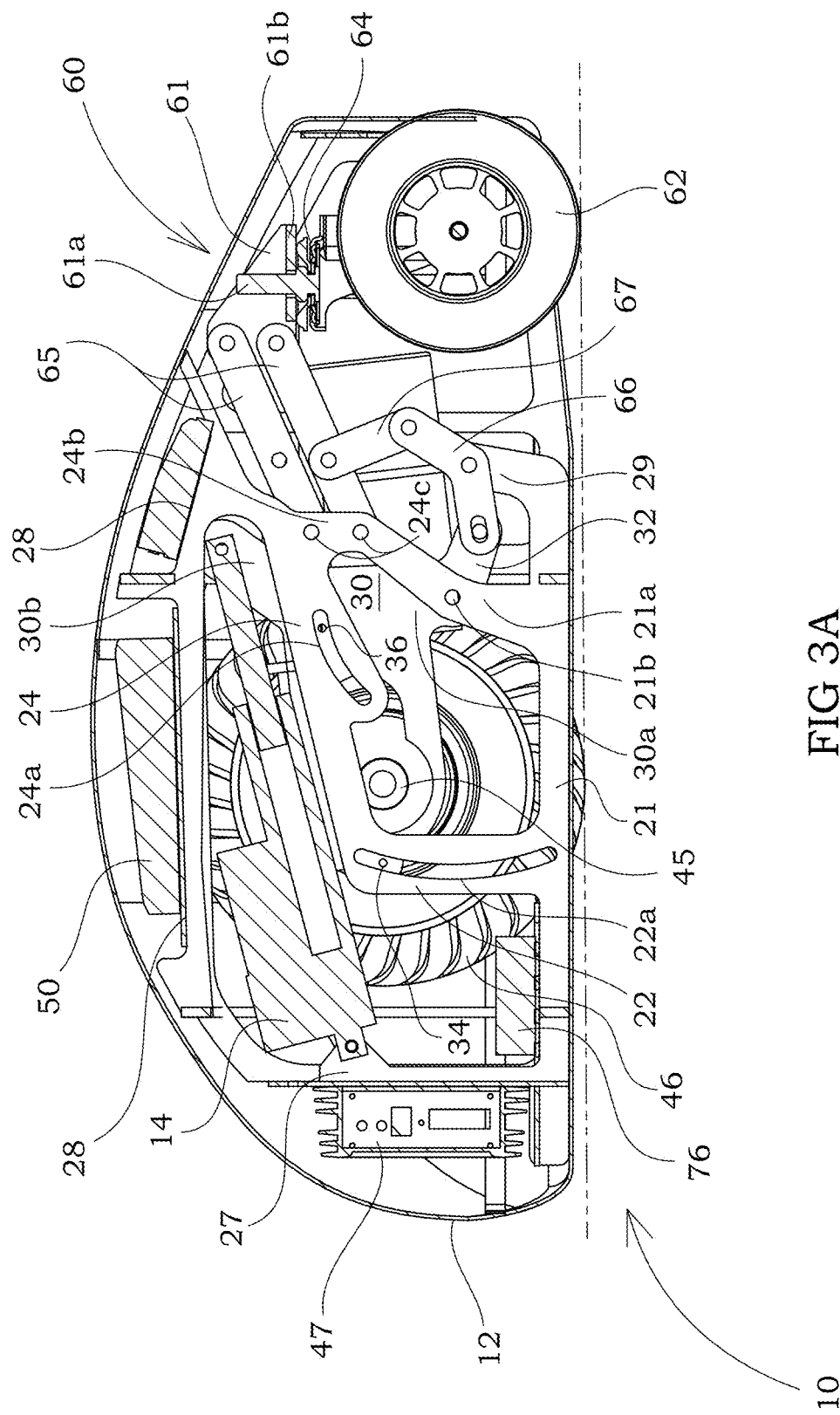
FIG. 3A provides a side cutaway view of the embodiment of a frame, driven wheel support frame, and caster assembly shown in FIG. 2 with the wheels retracted.

The illustrative embodiment allows the user to actuate the driven wheels 46 and sensor wheel 62 between a first and second position, wherein the first position corresponds to the operating state of the rover 10 (as shown most clearly in FIG. 3B) and the second position corresponds to the transport state of the rover 10 (as shown most clearly in FIG. 3A). In the transport position, a portion of the wheels 46, 62 may be retracted upward into the cover 12 so that the overall size of the rover 10 is reduced.

Figure 3B:
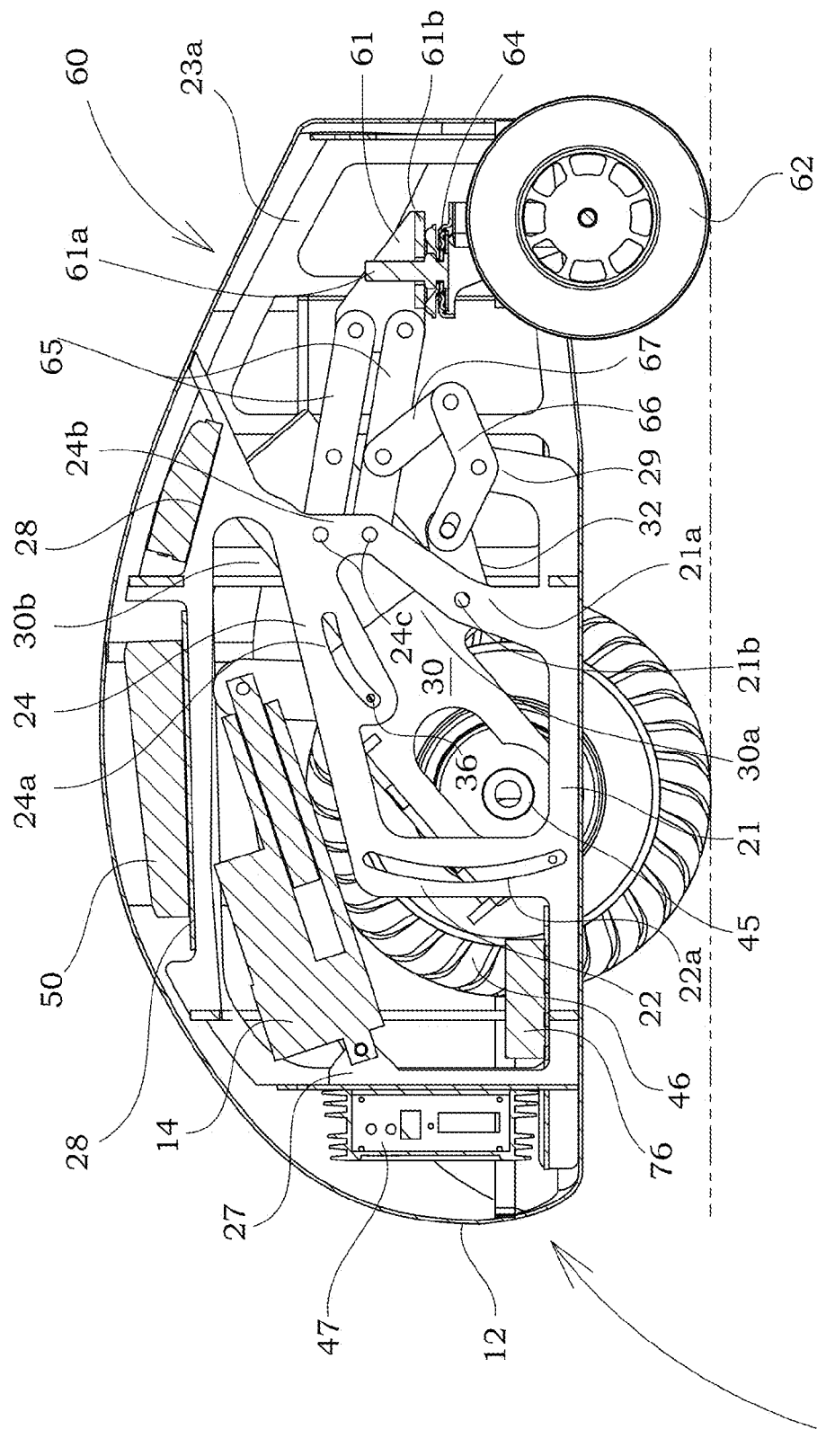
FIG. 3B provides a side cutaway view of the embodiment of a frame, driven wheel support frame, and caster assembly shown in FIG. 2 with the wheels deployed.
Figure 4:
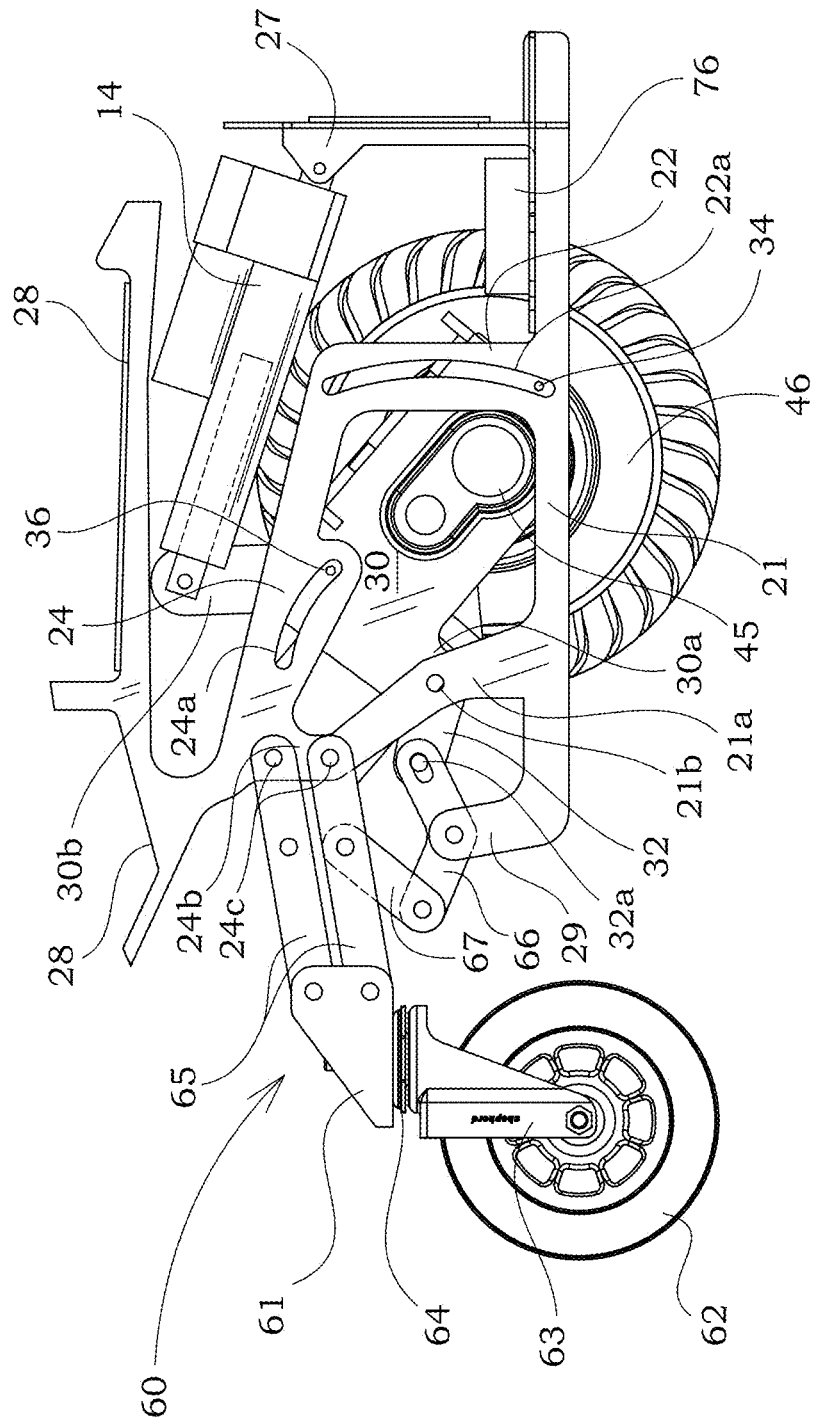
FIG. 4 provides a detailed view of one embodiment of a caster assembly, driven wheel support frame, and various elements related thereto.

The actuation of a driven wheel 46 between the first and second positions may be facilitated by the actuation of the driven wheel support frame 30 and caster assembly 60 between first and second positions corresponding to the first and second positions of the wheels 46, 62 described above. A direct comparison of FIGS. 3A & 3B in light of FIG. 4 shows the interaction between the various elements of the frame 20, driven wheel support frame 30, caster assembly 60, extension arm(s) 65, translator(s) 66, and connector(s) 67 in the illustrative embodiment of the rover 10 that allows actuation between the first and second positions. The wheels 46, 62 may be actuated between the first and second positions manually or via powered actuators. In the illustrative embodiment, an actuator 14 may be cooperatively engaged with the frame 20 via an actuator support member 27 at one end of the actuator 14. The actuator 14 may be cooperatively engaged with the driven wheel support frame 30 via the actuator pivot tab 30b at the opposite end of the actuator 14. Other embodiments of the rover 10 have fixed driven wheels 46 and/or a fixed sensor wheel 62.

As the actuator 14 is extended, the wheels 46, 62 move from the second position to the first position (i.e., the wheels 46, 62 are retracted inward). From the vantage depicted in FIGS. 3A & 3B, the extension of the actuator 14 causes the driven wheel support frame 30 to rotate clockwise about the driven wheels support pivot 21b with respect to the frame 20 (counterclockwise from the vantage depicted in FIG. 4). This causes the end of the translator 66 pivotally engaged with the driven wheel support frame 30 to move downward and the opposite end of the translator 66 to move upward. Consequently, the end of the connector(s) 67 engaged with the extension arm(s) 65 moves upward, which causes the extension arm(s) 65 to move upward, thereby raising the caster assembly 60 and sensor wheel 62. A first bar 34 may slideably engage a first slot 22a and a second bar 36 may slideably engage a second slot 24a to ensure the desired relative position between the frame 20 and drive wheel support frame 30 is maintained.

An infinite number of other structures and/or methods exist for actuating the wheels 46, 62 between first and second positions. Accordingly, the scope of the rover 10 as disclosed and claimed herein is in no way limited by the specific configuration of the frame 20, driven wheel support frame 30, caster assembly 60, extension arm 65, translator 66, and/or connector 67. It is contemplated that modifications and/or variations of the rover 10 may not require all of the elements in the illustrative embodiment, and that those modifications and/or variations will be within the scope of the present disclosure.

As previously stated, at least one sensor wheel 62 may be included in the illustrative embodiment of the rover 10. In other embodiments of the rover 10 not pictured herein, the rover 10 includes a plurality of sensor wheels 62, wherein each sensor wheel 62 is pivotally secured to a yoke 63. The yokes 63 may be mounted to a common toolbar or caster yoke receiver 61, wherein each yoke 63 may independently adjust to variations in the surface adjacent that respective sensor wheel 62. Accordingly, each sensor wheel 62 may be equipped with at least one sensor 70 and/or GPS module 72 as explained in detail below for the illustrative embodiment of the rover 10. Additionally, a rotation position sensor 64 may be associated with each sensor wheel 62 to record the angle of each sensor wheel 62 with respect to the caster yoke receiver 61 (and consequently with respect to the frame 20). It is contemplated the rotation position sensor 64 may be configured as a hall effect sensor, but other types of sensors 70 may be used to determine the relative angle of the sensor wheel 62 without limitation. Although not shown in FIG. 6, the rotation position sensor 64 may be in direct communication with the CPU 50, or it may be routed through a control port 77.

Figure 5:
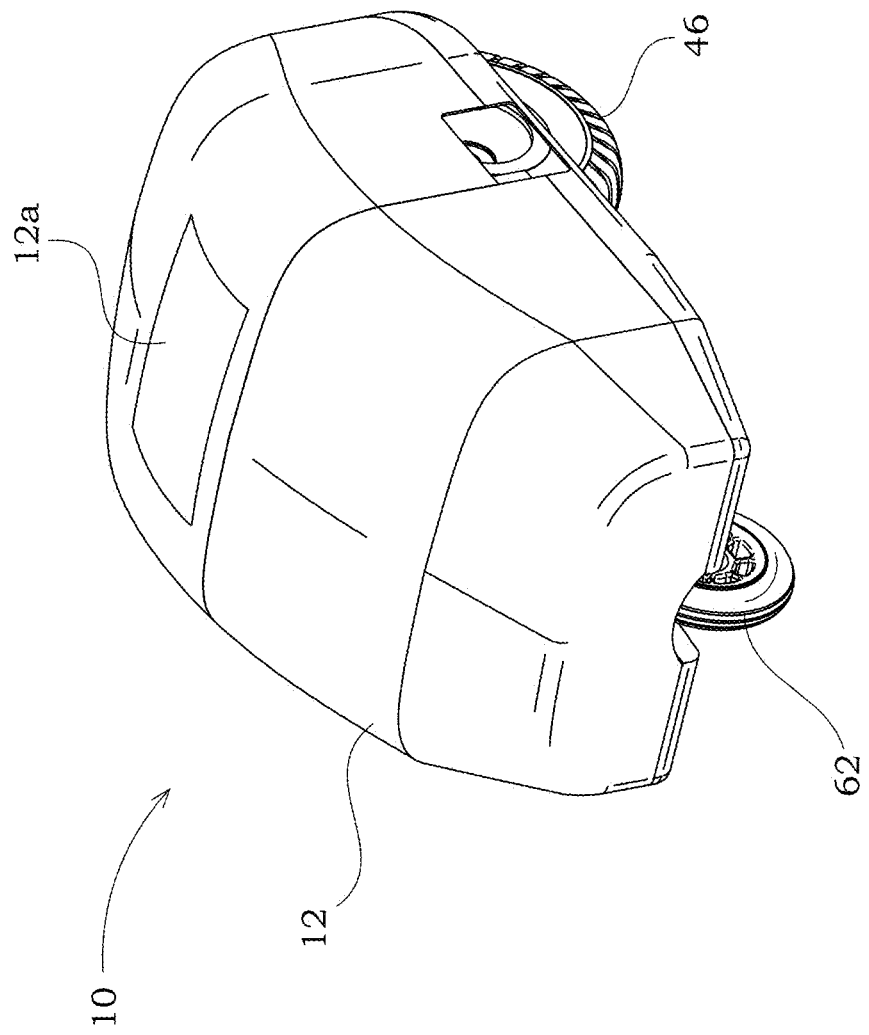
FIG. 5 provides a perspective view of one embodiment of a cover that may be used with certain embodiments of the rover.

The illustrative embodiment of a frame 20 is configured to accept a cover 12 such as that shown in FIG. 5 to fit securely over the top of the frame 20. However, in other embodiments of the rover 10, the cover 12 may have a different configuration, orientation, and/or surface contours, in which case the frame 20 would be configured differently. Accordingly, the specific shape, dimensions, configuration, and/or orientation of the rover 10 are in no way limiting to the scope thereof. Additionally, the cover 12 may be formed with an access door 12a to easily access certain internal components of the rover 10, which components are described in further detail below.

Figure 6:
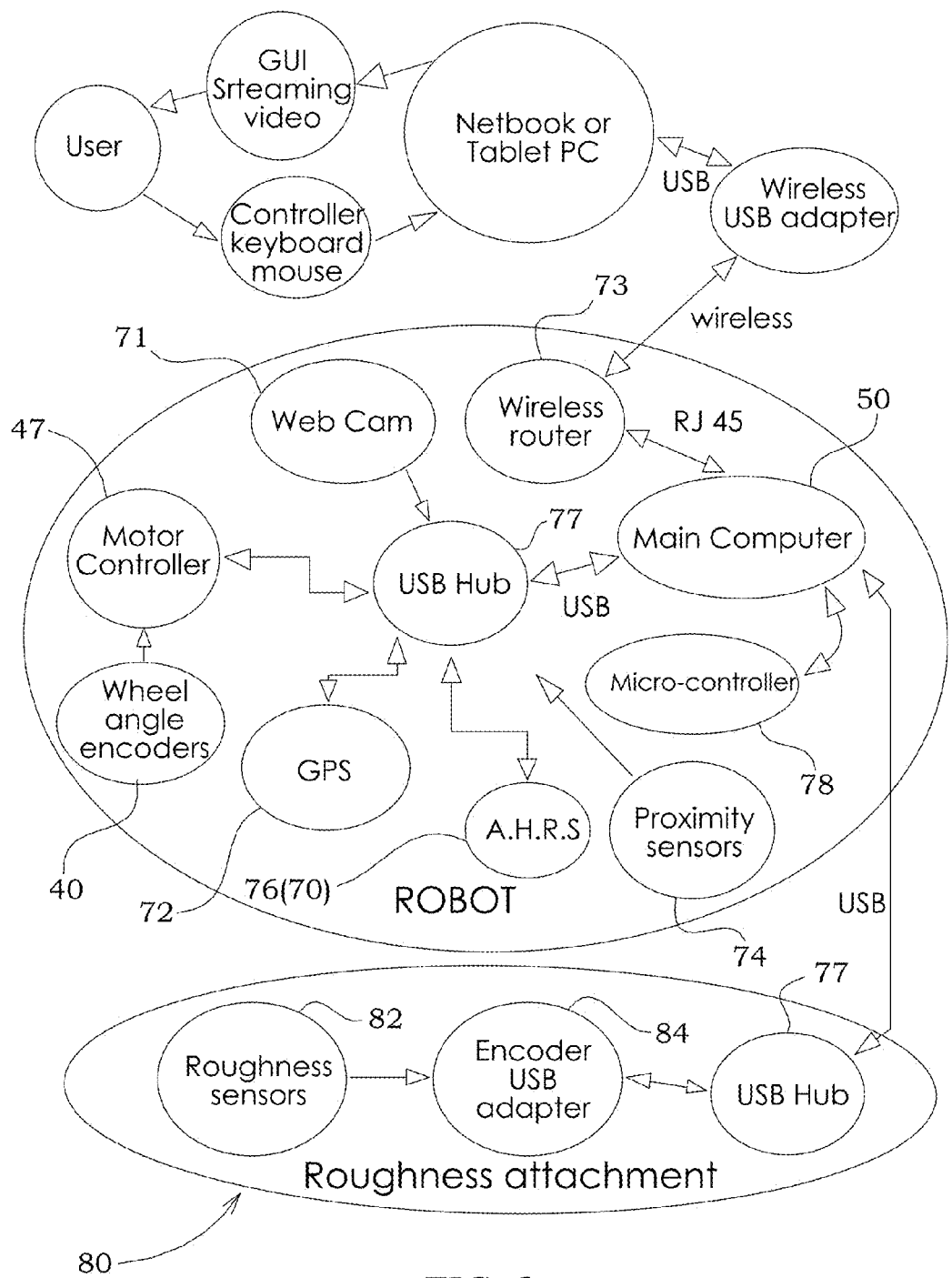
FIG. 6 provides a schematic view of one embodiment of a communications system that may be used with certain embodiments of the rover.
Figure 7A:
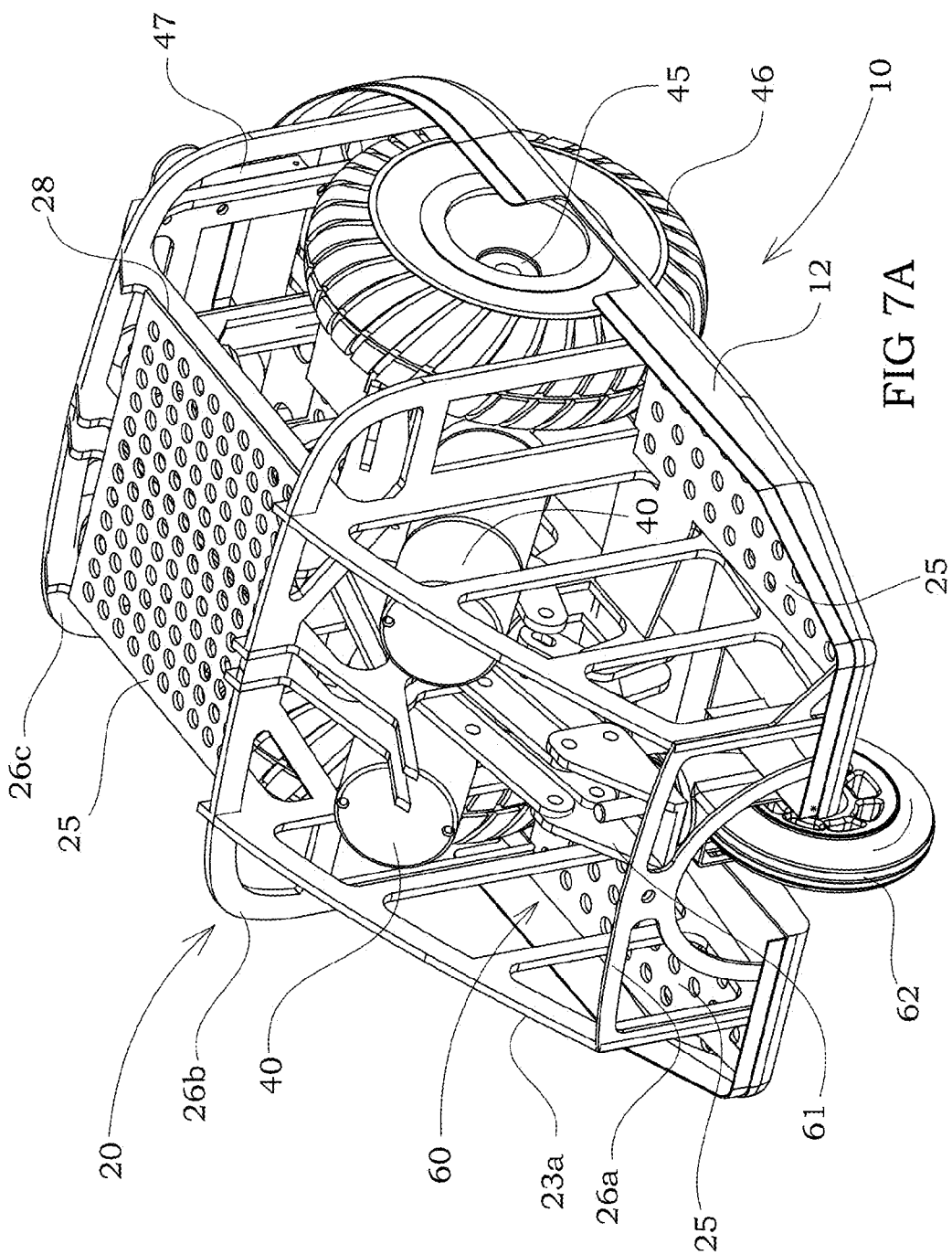
FIG. 7A provides a front perspective view of one embodiment of a rover with the cover and certain internal elements removed for clarity.
Figure 7B:
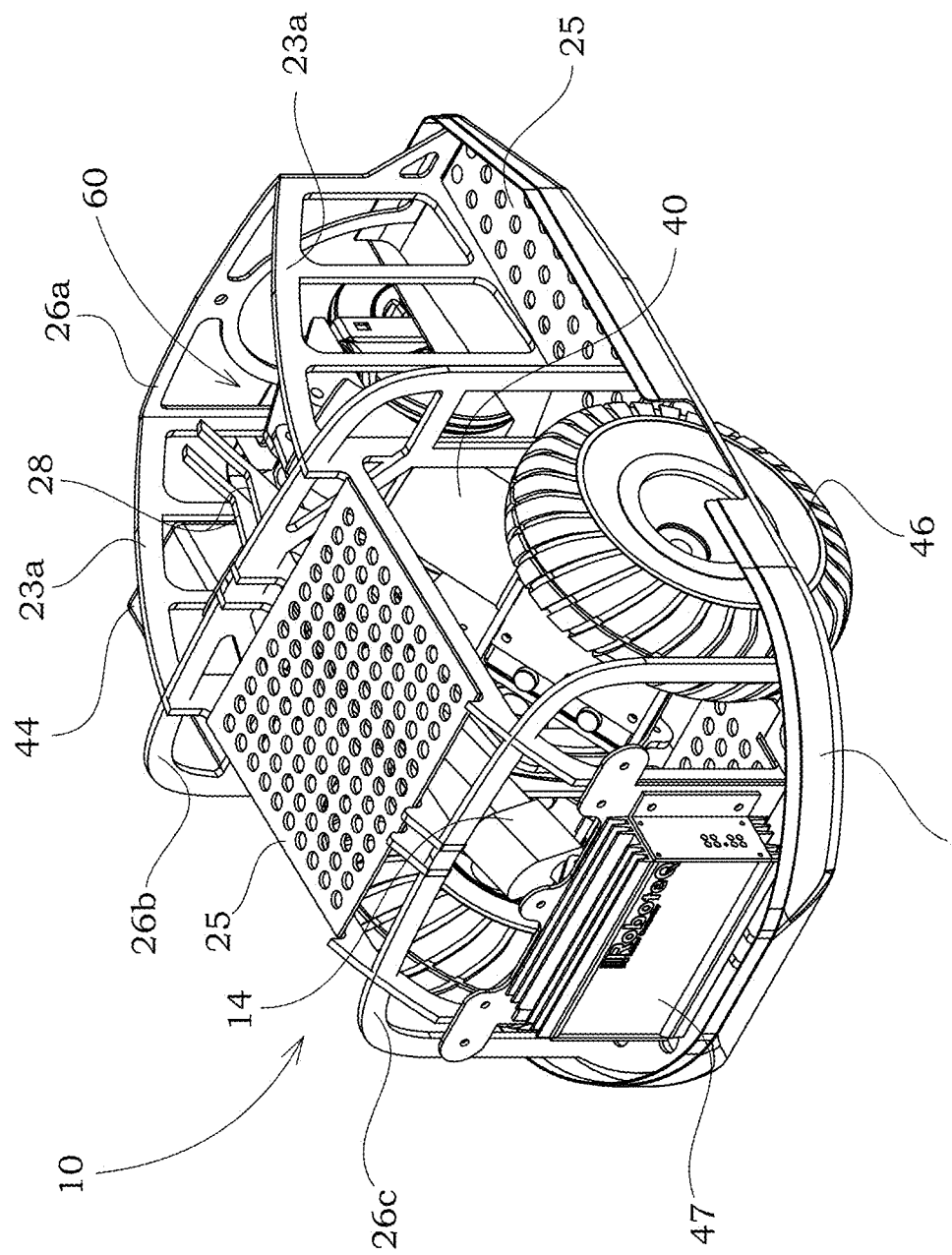
FIG. 7B provides a rear perspective view of one embodiment of a rover the cover and certain internal elements removed for clarity.

One embodiment of a communications system (including the model names of various elements for that embodiment) that may be used with the illustrative embodiment of the rover 10 is shown in FIG. 6. As shown, that embodiment includes a CPU 50, which may be secured to the frame 20 inside the cover 12 as shown in FIGS. 1, 3A, & 3B. It is contemplated that in many embodiments of the rover 10, the CPU 50 may be configured as a laptop computer. It is contemplated that the cover 12 will include an access door 12a adjacent the CPU 50 for easy access thereto. However, other access doors 12a may be positioned in the cover 12 without limitation. The CPU 50 may be used to control the various systems of the rover 10, as well as to gather and record data. The CPU 50 may be in communication with a transponder 73 (e.g., wireless router as shown in the embodiment pictured in FIG. 1), control port 77, micro-controller 78 (shown in FIG. 6 for the illustrative embodiment of the rover 10), and roughness module 80. These various components may be in communication with one another wirelessly (e.g., Bluetooth, 802.11g protocol, etc.), or wired (e.g., USB, category 5 network cables, etc.), in which case a control port 77 may be necessary.

Other components in the illustrative embodiment are also in communication with the CPU 50 (either wired or wirelessly). These components include at least one sensor 70, a camera 71, a GPS module 72, a motor controller 47, and an AHRS 76. The illustrative embodiment shows the camera 71, GPS module 72, motor controller 47, and AHRS 76 connected to a control port 77 fashioned as a USB hub, but as previously described, the various elements may be in communication with the CPU 50 directly and/or by other methods and/or structures (e.g., wirelessly using a wireless router).

The illustrative embodiment of the rover 10 is configured with at least one proximity sensor 74 to mitigate the likelihood of contacting an obstacle during use of the rover 10. For example, if a wheelbarrow, tractor, or other item is mistakenly left on the parcel and the rover's 10 path (which path may be by the GPS module 72) routes the rover 10 so that it will collide with such an item, absent a collision avoidance system, the rover 10 would collide with the item. Accordingly, at least one proximity sensor 74 may be in communication with the micro-controller 78 (as shown in FIG. 6) to prevent such a collision.

A camera 71 may also be in communication with the CPU 50 (either directly or via a control port 77) to provide additional information, including but not limited to a live streaming video feed to a remote computer 52. The images captured by the camera 71 (which may be a still or moving video camera 71) may also be used as a type of collision avoidance system, as described in detail above for a proximity sensor 74. Additionally, the images may be used to more fully develop an accurate model of the parcel when used in conjunction with other information the rover 10 gathers. It is contemplated that certain embodiments of the rover 10 will include a video camera 71 secured to a horizontal brace 24 of the frame 20 external of the cover 12.

At least one battery 44 may be situated in the frame 20, as shown in FIG. 1. The illustrative embodiment of the rover 10 includes two batteries 44. The batteries 44 may be configured to provide electrical energy to the motors 40, CPU 50, and/or any other component of the rover 10 requiring an external power source to function. Additionally, the batteries 44 may be positioned such that the weight of the batteries 44 helps to ensure proper contact between the sensor wheel 62 and the surface of the parcel.

In the illustrative embodiment of the rover 10, the GPS module 72 is positioned directly above the sensor wheel 62, on the GPS mount 61a. Other sensors 70 may also be associated with the sensor wheel 62 to gather additional information about the surface and/or conditions of the parcel at a particular point. It is contemplated that U.S. and/or GLONASS satellites will be used for the GPS module 72, which provides three-dimensional coordinates of the GPS module 72 within 1 millimeter of accuracy. The AHRS 76 may be mounted adjacent the caster plate 61b (and hence the sensor wheel 62 and GPS module 72) to measure the angle, position, heading and/or attitude of the rover 10 during use. The rotation position sensor 64 measures the rotation angle of the sensor wheel 62 with respect to the frame 20. Accordingly, the CPU 50, using the know relative position between the GPS module 72 and the sensor wheel 62, the attitude and heading from the AHRS 76, the sensor wheel 62 rotation angle from the rotation position sensor 64, and the measured GPS coordinates, the location of the contact point between the sensor wheel 62 and the surface of the parcel may be computed to within 1 mm of accuracy and subsequently recorded. Other sensors 70 may be used to achieve similar results and/or gather similar data without limitation. Consequently, the rover 10 is able to measure and record actual elevation changes in the surface of the parcel as small as 1 mm.

The configuration described above allows the rover 10 to develop extremely accurate data with respect to the surface conditions, topography, and/or terrain conditions for a specific parcel. Because the sensor wheel 62 is always in constant, direct contact with the surface, imperfections in the surface that may not be detected with other topography sensors (e.g., depressions in a grass field), such as laser levels, are accurately recorded by the rover 10. Other sensors 70, such as spread spectrum lasers, may be used with the rover 10 to gather additional data about the surface of the parcel, to further increase the accuracy of the rover 10, and/or as a redundant correction sensor for elevation changes.

The rover 10 may be controlled by a software program residing on the CPU 50, a remote computer 52, and/or a combination thereof. The rover 10 may traverse the parcel autonomously, or it may be controlled by a user in real time via either the CPU 50 and/or remote computer 52. In an application wherein the rover 10 is configured to autonomously traverse the parcel, the grid and/or spacing of passes the rover 10 takes may be adjusted by the user. That is, if the rover 10 is programmed to make linear passes (i.e., back and forth) across a parcel, the distance between the linear passes may be set by the user using a software program residing on the CPU 50, a remote computer 52, and/or a combination thereof. The shorter the distance, the greater the accuracy, but the time required to analyze the parcel is increased, as are the resources (e.g., power, data storage, etc.) to facilitate the data gathering. Additionally, the rover 10 may be programmed to make periphery passes about a parcel by decreasing size. Accordingly, the specific method and/or pattern in which the rover 10 traverses a specific parcel in no way limits the scope of the rover 10 as disclosed and claimed herein. In an application wherein the rover 10 is controlled by the user in real time, it is contemplated that wireless control will be most advantageous, and any method and/or structure (e.g., Bluetooth, 802.11 protocols, radio frequency range controls, etc.) may be used to control the rover 10 in real time.

The data sampling rate for the GPS module 72, camera 71, and/or various sensors 70 on the rover 10 may be adjusted by the user, and the optimal rate will vary from one embodiment and/or application of the rover 10 to the next. It is contemplated that many applications will use a rate of at least 1 Hz, but the rate is in no way limiting to the scope of the rover 10.

The various data the rover 10 gathers may be stored locally on the CPU 50, or the information may be transmitted to another location via a transponder 73 (e.g., a remote computer 52), such as a wireless router as shown in the illustrative embodiment of the rover 10. It is contemplated that for some embodiments a control CPU (which may be a remote computer 52) will be in constant communication with the rover 10 during use. The user may monitor and/or control the function, position, and/or other variables of the rover 10 from a remote computer 52 during use of the rover 10. For example, it is contemplated that data the rover 10 collects during use may be streamed to the remote computer 52 in real time, as well as video feed from the camera 71. Additionally, the transponder 73 may also facilitate other control schemes for the rover 10, such as remote control from another computer (which may also use a camera 71), or other functionality. However, it is contemplated that in most applications of the rover 10, it will be guided by the GPS module 72 in concert with the CPU 50, micro-controller 78, and/or motor controller 47 for the driven wheels 46 according to the user's specifications. That is, the CPU 50 will direct the micro-controller 78 to provide power to one or both of the driven wheels 46 based on information the GPS module 72 provides to the CPU 50 and the specifications the user inputs to the CPU 50.

Figure 8:
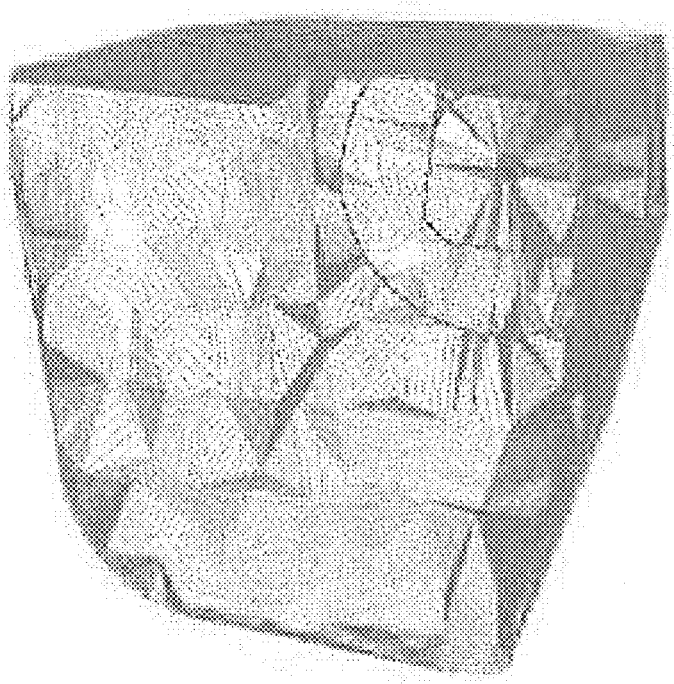
FIG. 8 shows two topographical maps that contrast the differences in precision for creating such a map.
Figure 8:
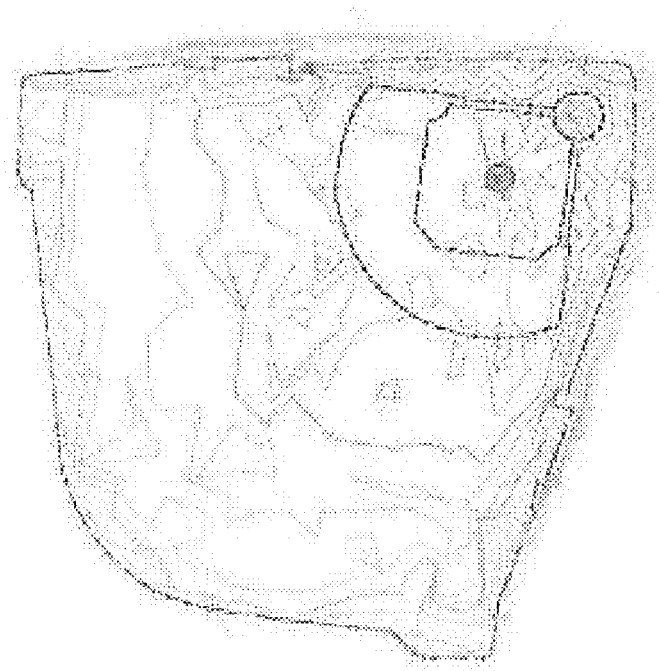

It is contemplated that the rover 10 will generate a three-dimensional map of the specific parcel after it has completed traversing the parcel with the grid spacing determined by the user. As mentioned above, tighter grid spacing will yield more accurate results. The data recorded by the rover 10 during it traversal of the parcel may be agglomerated and converted to a graphical representation, such as that shown in FIG. 8. Additionally, this three-dimensional map may be rendered in physical form by a three-dimensional printer.

The rover 10 may also be outfitted with a sensor 70 configured as a light sensor. This sensor 70 may be in communication with the CPU 50 as with the other sensors 70 and/or components of the rover 10. The light sensor 70 may be used to develop a heat map of the lumens per square foot of a given parcel. As with the other data sampling rates, the user may determine at what intervals the rover 10 records data from the light sensor 70. Accordingly, the rover 10 may be equipped to generate an extremely accurate map of the lighting for a specific parcel.

The rover 10 may also include a vegetation health module. It is contemplated that such a module would be positioned within the frame 20 near other sensors 70, and would include an IR camera in communication with the CPU 50. The amount of energy absorbed by various vegetation at a given location on the parcel could be compared to a standard, which information will allow the user to pinpoint specific areas of the surface that have unhealthy and/or weak vegetation.

The rover 10, cover 12, frame 20, driven wheel support frame 30, communication system, motor 40, motor controller 47, CPU 50, caster assembly 60, sensor wheel 62, sensor 70, camera 71, GPS module 72, transponder 73, proximity sensor 74, AHRS 76, control port 77, micro-controller 78, and roughness module and/or various elements thereof may be constructed of any suitable material known to those skilled in the art. In the embodiment as pictured herein, it is contemplated that most structural elements will be constructed of metal or metallic alloys, polymers, or combinations thereof. However, other suitable materials may be used without limitation.

It should be noted that the rover 10 and the various components thereof are not limited to the specific embodiments pictured and described herein, but is intended to apply to all similar apparatuses and methods for providing accurate terrain, topographical, and/or other surface condition data. Modifications and alterations from the described embodiments will occur to those skilled in the art without departure from the spirit and scope of the rover 10. Having described the preferred embodiment, other features, advantages, and/or efficiencies of the rover 10 will undoubtedly occur to those versed in the art, as will numerous modifications and alterations of the disclosed embodiments and methods, all of which may be achieved without departing from the spirit and scope of the rover 10.

2. Description of Illustrative Method

The rover 10 may be used for many purposes, including but not limited to three-dimensional mapping on natural and/or artificial surfaces, surface verification, three-dimensional modeling, surface safety analysis, event recovery, event damage verification, surface condition audits, as-built surface surveys, vegetative health analysis, and/or to measure point-specific lighting levels. The illustrative method of use for a rover 10 described herein relates to three-dimensional mapping, but is in no way limiting.

In one embodiment, the rover 10 uses geospatial position referencing, spread spectrum lasers, digital photography, and a sensor wheel 62 to create a three-dimensional model of the surface of a parcel. This three-dimensional model may show surface conditions with accuracy of +/− 0.1 mm, although accuracy of +/− 1.0 mm will be adequate for certain applications. The three-dimensional model may be used to evaluate surface safety, variances, sink holes, defective areas in synthetics, and wear areas, among other uses.

In one embodiment of a method of using the rover 10, the rover makes a peripheral pass around the parcel to be analyzed to establish boundaries. This peripheral pass may be done autonomously using the various control elements of the rover 10, or it may be performed manually the user (either remotely or locally). The rover 10 may then traverse the parcel (again, either manually or autonomously) inside the boundaries at programmed spacing using GPS (U.S. and/or GLONASS satellites) and position sensors. During this time, the rover 10 may record and/or transmit data relating to the parcel (e.g., terrain, lumens per square foot, etc.). The rover 10 may use slope sensors (which may be part of an AHRS 76) to give accuracy correction for elevation to create a complete and accurate three-dimensional map of the entire parcel. The rover 10 may also use proximity sensors 74 to negotiate obstacles. The rover 10 may use on-board software and a wireless receiver and/or transponder 73 to transmit data to an onsite and/or off-site computers.

The rover 10 may be used to generate a three-dimensional file that may be used for renovation or construction of the parcel. The file may have any desired changes made and then be transferred to the surface conditioning equipment (e.g., grader, compactor, etc.). It is contemplated that with simple adjustments to the rover 10 (such as a blade and various actuators to control the blade), the rover 10 could perform the functions of mapping and correcting the surface of the parcel simultaneously. Alternatively, the map the rover 10 creates may be digitized and input into the grading equipment having the requisite control scheme, which grading equipment may be configured to automatically correct imperfections shown in the map. Such maps may be useful after an event has occurred at a sporting field (e.g., a concert at Dodger Stadium) so that the integrity of the surface may be verified prior to using the sporting field for a sporting event, which mitigates the chance of injury to players.

It should be noted that the present mapping method is not limited to the specific embodiments pictured and described herein, but is intended to apply to all similar processes or methods of producing an accurate three-dimensional map of a parcel. Accordingly, the specific grid sizes, data sampling rates, structures used to gather, analyze, and/or store data, electrical components, communication media, etc. used to explain the illustrative method of use of the rover 10 as disclosed herein are for illustrative purposes only and in no way limit the scope of the present disclosure.

Modifications and alterations from the described embodiments will occur to those skilled in the art without departure from the spirit and scope of the present method. Furthermore, while the method has been described in connection with specific embodiments thereof, it will be understood that it is capable of further modifications and this application is intended to cover any variations, uses, or adaptations of the method following, in general, the principles of the method and including such departures from the present disclosure as come within known or customary practice within the art to which the method pertains and as may be applied to the essential features herein before set forth, and as follows in the scope of the appended claims.

The invention claimed is:

1. A rover comprising:
 a. a frame;
 b. a motor mounted to said frame;
 c. at least one driven wheel pivotally engaged with said frame, wherein said at least one driven wheel is in mechanical communication with said motor;
 d. at least one yoke pivotally attached to said frame about a generally vertical axis;
 e. at least one sensor wheel pivotally attached to said at least one yoke about a generally horizontal axis, wherein said at least one sensor wheel is passive and not in communication with any power source;
 f. at least one sensor attached to said frame;
 g. at least one GPS receiver attached to said frame, wherein the relative position among the center of said at least one sensor wheel, at least one sensor, and said at least one GPS receiver is fixed, such that said at least one sensor wheel communicates changes in elevation of a ground surface to said at least one GPS receiver when said at least one sensor wheel traverses said ground surface.

2. The rover according claim 1 wherein said rover further comprises at least one battery attached to said frame.

3. A rover comprising:
 a. a frame, said frame comprising:
  i. a frame base;
  ii. a driven wheel support tab engaged with said frame base;
  iii. at least one vertical brace engaged with said frame base;
  iv. at least one horizontal brace engaged with said at least one vertical brace;
 b. a driven wheel support frame pivotally engaged with said frame, said driven wheel support frame having a frame pivot tab, wherein said frame pivot tab is engaged with said frame via a driven wheel support pivot, wherein said driven wheel support frame may be actuated between a first and second position;
 c. a driven wheel rotatably engaged with said driven wheel support frame, wherein actuation of said driven wheel support frame from said first to said second position causes said driven wheel to retract into said frame;
 d. a caster assembly cooperatively engaged with said frame, said caster assembly comprising:
  i. a yoke pivotally engaged with said caster assembly about a generally vertical axis;
  ii. a sensor wheel pivotally engaged with said yoke about a generally horizontal axis;
 e. a GPS module attached to said frame, wherein the relative position and geometry between the center of said sensor wheel and said GPS module is fixed, such that said sensor wheel communicates changes in elevation of a ground surface to said GPS module when said sensor wheel traverses said ground surface.

4. The rover according to claim 3 wherein said rover further comprises an extension arm, wherein said extension arm pivotally engaged said caster assembly with said frame.

5. The rover according to claim 4 wherein said rover further comprises a translator pivotally engaged with said frame, a connector, and said driven wheel support frame, wherein said translator communicates mechanical forces from said driven wheel support frame to said connector, and wherein said connector is also pivotally engaged with said extension arm.

6. The rover according to claim 5 wherein said frame further comprises a plurality of component supports secured to said at least one vertical brace.

7. A rover comprising:
 a. a frame, said frame comprising:
  i. a frame base having a first and second side;
  ii. a first and second arch engaged with said frame base an extending from said first and second sides of said frame base;
  iii. a driven wheel support tab engaged with said frame base, wherein said driven wheel support tab is positioned between said first and second sides of said frame base;
  iv. at least one vertical brace engaged with said frame base;
  v. at least one horizontal brace engaged with said at least one vertical brace and said first arch;
 b. a driven wheel support frame pivotally engaged with said frame between said first and second sides thereof, said driven wheel support frame comprising:
  i. a frame pivot tab engaged with said frame via a driven wheel support pivot, wherein an axis for rotation exists adjacent said driven wheel support pivot, and wherein said driven wheel support frame may be actuated between a first and second position with respect to said frame;
  ii. a translator connector secured to said frame pivot tab;
 c. a driven wheel rotatably engaged with said driven wheel support frame, wherein actuation of said driven wheel support frame from said first to said second position causes said driven wheel to retract into said frame;
 d. a caster assembly cooperatively engaged with said frame via an extension arm, said caster assembly comprising:
  i. a yoke pivotally engaged with said caster assembly about a generally vertical axis;
  ii. a sensor wheel pivotally engaged with said yoke about a generally horizontal axis;

e. a translator pivotally engaged with said translator connector of said driven wheel support frame, wherein said translator communicates mechanical forces to said extension arm to actuate said caster assembly between a first and second position with respect to said frame corresponding to said first and second positions of said driven wheel assembly.

8. The rover according to claim 6 wherein said rover further comprises a sensor engaged with said frame adjacent said sensor wheel, wherein said sensor determines the relative position of said sensor with respect to said GPS module.

9. The rover according to claim 8 wherein said rover further comprises a CPU in communication with said GPS module and said sensor, wherein said CPU is programmed to calculate the precise contact point between said sensor wheel and a parcel using said fixed position of said GPS module with respect to the center of said sensor wheel, a set of coordinates from said GPS module, and a set of relative coordinates from said sensor.

10. The rover according to claim 9 wherein said sensor is further defined as an attitude/heading reference system.

11. The rover according to claim 10 wherein said rover is further defined as comprising a camera engaged with said frame, wherein said camera is in communication with said CPU.

12. The rover according to claim 11 wherein said rover is further defined as comprising a proximity sensor engaged with said frame, wherein said proximity sensor is in communication with said CPU.

13. The rover according to claim 12 wherein said rover is further defined as comprising:
   a. a motor engaged with said frame and providing rotational energy to said driven wheel; and,
   b. a motor controller engaged with said frame, wherein said motor controller is in communication with said CPU and said motor.

\* \* \* \* \*